INVENTORS
HAROLD MOREINES
MAURICE RIFKIN
BY Oscar B Brumback
ATTORNEY

United States Patent Office 2,959,380
Patented Nov. 8, 1960

2,959,380

INSTRUMENT CONTROL SYSTEM FOR AIRCRAFT

Maurice Rifkin, Tarrytown, N.Y., and Harold Moreines, Hillside, N.J., assignors to The Bendix Corporation, a corporation of Delaware Filed Mar. 26, 1954, Ser. No. 418,897

15 Claims. (Cl. 244—77)

This invention relates generally to control systems and more particularly to apparatus for shaping the control signal for control systems.

In instrument landing systems, the craft is operated in response to a control effect that is a function of the angular displacement of the craft from a guide beam and the displacement of the heading of the craft from a fixed heading. The control effect representing the heading displacement error may be derived from a signal developing device which may be an inductive device having a rotor displaceable angularly relative to a stator. Generally, these inductive devices are so wound that the output derived from the stator, when the rotor is energized, corresponds to the sine function of the angular position of the rotor. Thus, the output signal varies sinusoidally with the heading displacement error.

Some distortion of the wave shape is inherent in such devices, however. Thus, for small angles of rotor displacement, the voltage is substantially a straight line; while, for large angles of displacement, the voltage may vary substantially from a straight line. This distortion becomes important when an attempt is made to bracket the guide beam at a large angle. Under these conditions, the system may not be able to recognize the direction, right or left, that the craft should be turned to reach the landing strip; therefore, the craft may be turned away from the landing strip and orbit or follow a curve path.

An object of the present invention, therefore, is to provide a novel device for shaping a directional control signal so that the craft will properly bracket a guide beam.

Another object of the invention is to provide a novel circuit for operation with a sinusoidal signal generator so that the output of the generator will vary substantially linearly with displacement of one element of the generator relative to the other.

A further object is to provide a novel circuit for developing a signal having a linear curve function from a signal having a sinusoidal curve function.

In the instrument landing system contemplated by the present invention, a novel signal expander is interposed between the signal device developing the signal corresponding to the error in heading of the craft and a computer developing the control effect corresponding to a function of the displacement from the desired heading and the guide beam, whereby the novel signal expander adds an increment to the heading signal so that the summation varies substantially linearly with the angular error in heading.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for the purpose of illustration and description only, and are not intended as a definition of the limits of the invention.

In the drawings wherein like parts are numbered alike:

Figure 1:
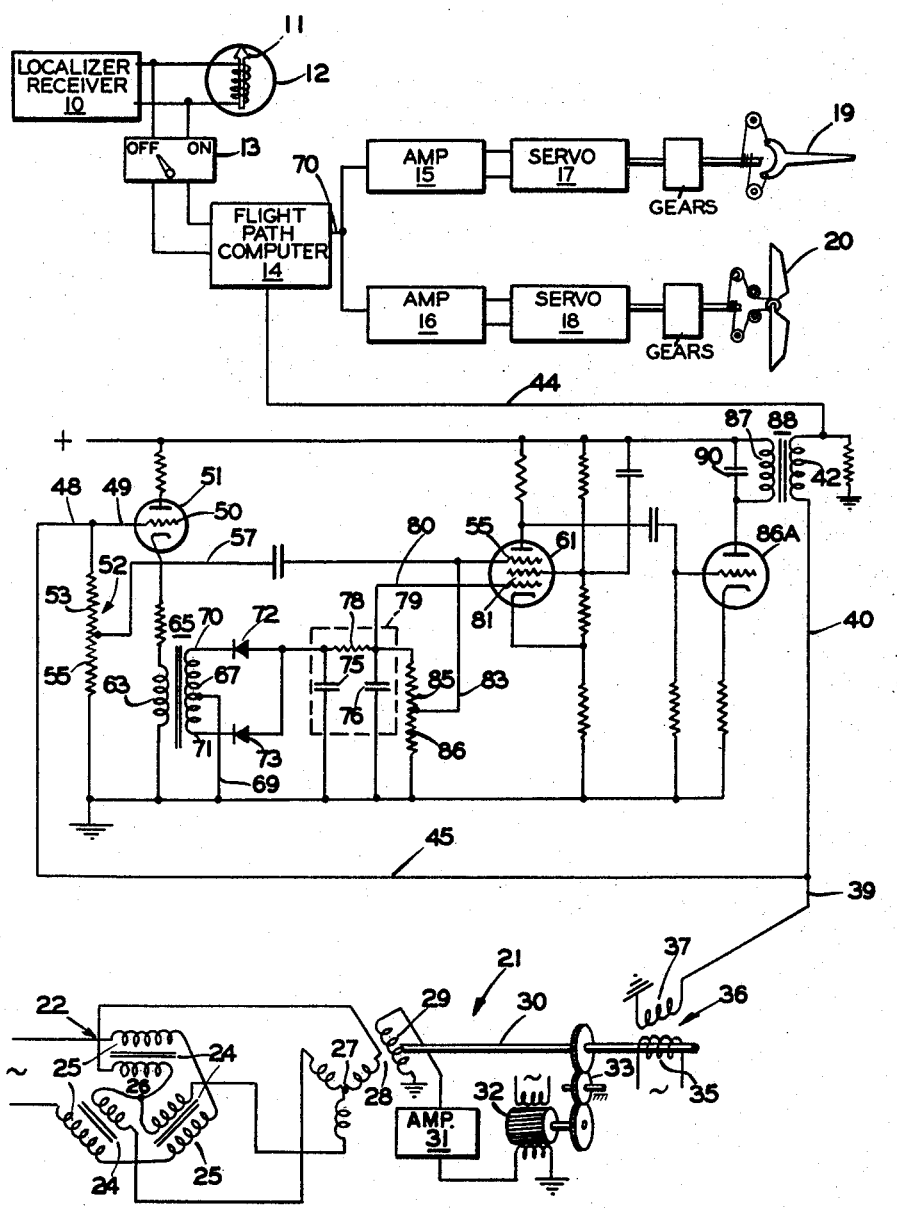
Fig. 1 is a schematic illustration of a complete wiring diagram of the novel signal shaping circuit of the present invention incorporated in an instrument landing system for aircraft.

The novel signal expanding circuit of the present invention is shown as being incorporated in an instrument landing system which may be generally of the type described in U.S. Patent No. 2,592,173, issued April 8, 1952 to P. A. Noxon et al. In the embodiment of the steering system shown in Figure 1, a radio 10 tuned to the localizer beam at the landing strip, develops a control signal corresponding to the displacement of the craft from the beam. This signal is used to move a cross pointer 11 on a dial 12 to indicate the position of the craft relative to the localizer beam and also, when a switch 13 is moved to its "on" position, is applied to the input of a flight path computer unit 14. The output of this computer, operating through the rudder and aileron channel amplifiers 15 and 16 and servomotors 17 and 18, controls the position of the rudder and aileron surfaces 19 and 20, respectively. Computer 14 also develops an output in response to an input from a master direction indicator 21.

An earth inductor compass 22 responds to the earth's magnetic field to provide a signal corresponding to a magnetic heading. The three cores 24 in this compass are arranged in triangular relation and are wound with excitation and secondary windings. Excitation windings 25 are connected in series and are energized by a pulsating current. Secondary windings 26 are connected to the three phase stator winding 27 of a receiver inductive device 28. The rotor winding 29 of this inductive device is mounted on shaft 30.

Signals corresponding to the angular position of the cores 24 relative to the earth's magnetic field are developed within each of the secondary windings 26 and are transmitted to stator winding 27 of inductive device 28. Should rotor 29 be displaced from a null relative to the field of stator winding 27, the error signal induced in rotor winding 29 is applied to a conventional voltage amplifier 31 whose output will energize a motor 32. This motor will drive shaft 30 until rotor winding 29 is at null.

This motor 32 not only operates through a gear train 33 to return the rotor winding 29 to a null position relative to stator winding 26 but also to displace the rotor winding 35 of another inductive device 36 from a null position relative to its stator winding 37 to develop a signal. When the craft is being landed by instruments, this signal is a function of the error between the heading of the aircraft and the direction of the runway.

Figure 3:
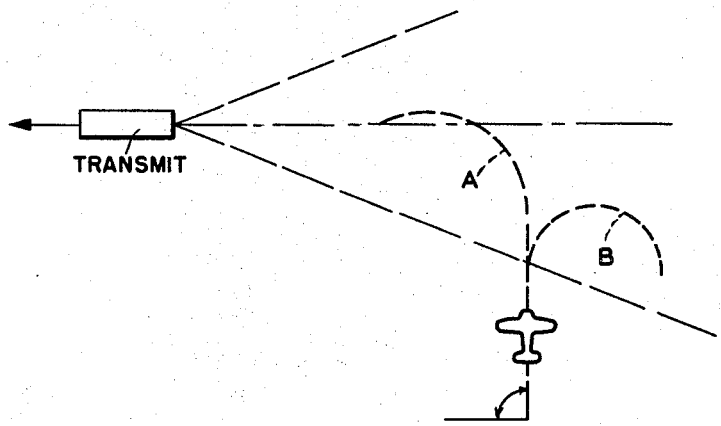
Fig. 3 illustrates the path of an aircraft attempting to bracket the localizer beam at a large angle.
Figure 2:
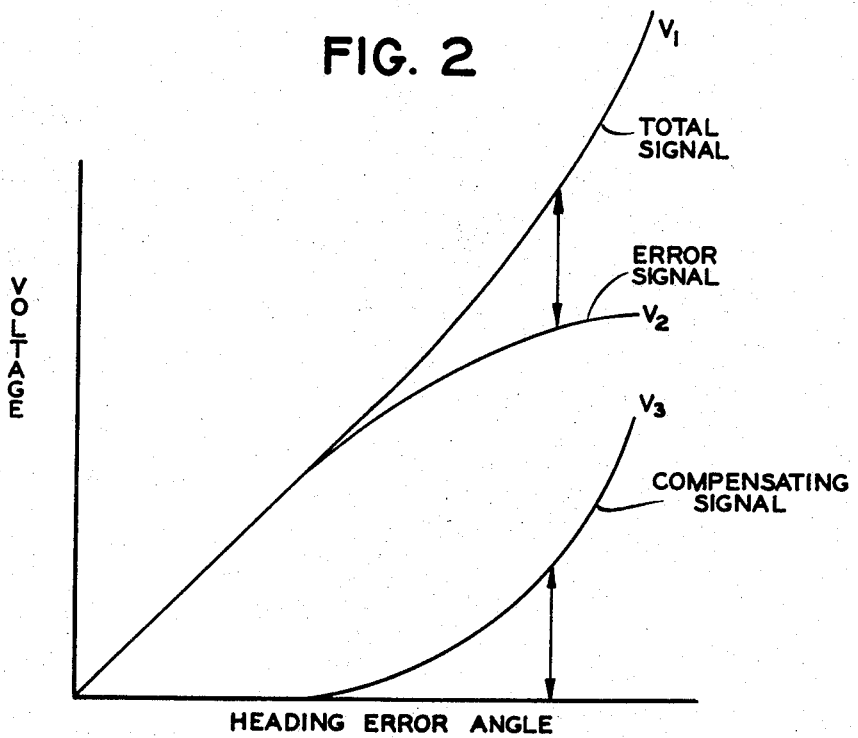
Fig. 2 is a graph illustrating the signals generated by an inductive signal developing device, by the novel circuit of Fig. 1, and by the resulting of these two curves.

As shown in Figure 2, the output of inductive device 36 varies sinusoidally with the heading error. Therefore, should the craft enter the beam pattern by making a large angle with respect to the beam, as shown in Figure 3, the heading error signal may not be sufficient to insure proper bracketing of the beam to cause the craft to travel along curve A; instead the craft may orbit along curve B. In accordance with the present invention, this condition is remedied by reshaping the heading error as shown in Figure 2.

Turning now to the novel signal expanding circuit, the signal from inductive device 36 is applied not only to flight path computer 14 by way of leads 39, 40, secondary winding 42 and lead 44 to flight path computer 14 but also by way of a lead 45 to the novel expander circuit. Lead 45 is connected to a voltage divider 52 formed by resistors 53 and 55 and by lead 49 to the grid 50 of a conventional amplifier 51. A lead 57 conducts the signal from voltage divider 52 to the suppressor grid 59 of a conventional pentode type tube 61.

Figure 4:
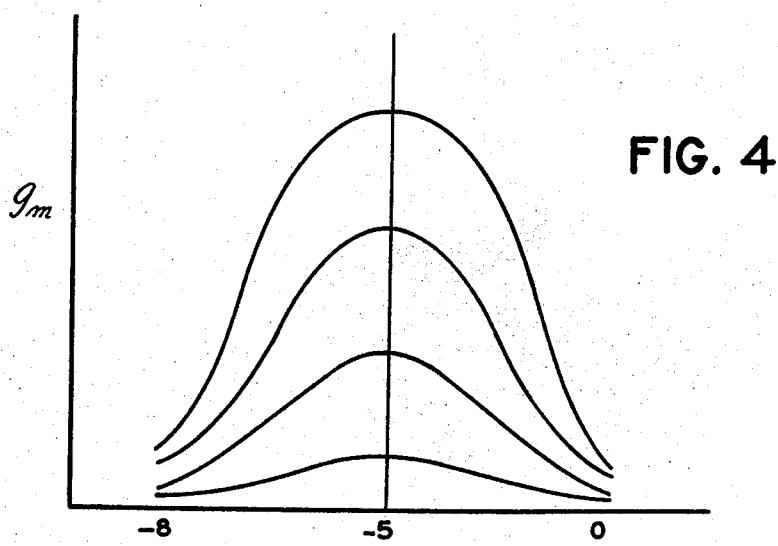
Fig. 4 is a graph illustrating the effect of grid voltages on a pentode type tube.

The signal at grid 50 changes the transconductance of tube 51, creating a change in voltage in the primary winding 63 of a coupling transformer 65 whose secondary winding 67 has its center tap 69 grounded and its end terminals 70 and 71 connected through rectifiers 72 and 73 to a filter network 79 formed by capacitors 75 and 76 and resistor 78. Thus, the signal is coupled by transformer 65 to rectifiers 72 and 73, and the direct current voltage from these rectifiers is applied through filter network 79 and a lead 80 to the control grid 81 of pentode 61. A portion of this direct current voltage is also applied by way of a lead 83 to the suppressor grid 59 of pentode 61. This portion varies as a fixed fraction of the voltage applied to the control grid, the fraction being determined by the relative values of resistors 85 and 86. These voltages are applied to both grids because the transconductance characteristic between the suppressor grid and the plate of pentode 61 is a function of the voltage on the suppressor grid as shown in Fig. 4 and begins to diminish as the suppressor grid voltage is increased positively beyond a predetermined limit. By applying the alternating current input signal voltage to the suppressor grid of the pentode, this relationship can be used to determine the gain of the signal in the tube.

To provide a signal having a linear curve characteristic from a signal having a sinusoidal curve characteristic, the transconductance of the pentode must be increased continuously with the amplitude of the input signal. This can be accomplished by operating the pentode on the positive slope of the curve shown in Fig. 4 by the use of a suitable voltage divider such as formed by resistors 85 and 86.

The output of the pentode is applied through a blocking condenser 84 to the grid of a conventional triode 86A whose output is applied across the primary winding 87 of a coupling transformer 88 to the secondary winding 42 where it is mixed with the signal from inductive device 36 of the master direction indicator 21. This signal combination is applied by way of lead 44 to flight path computer 14. A capacitor 90 across the primary winding 87 properly phases the variable gain output signal so as to conform with the signal on secondary winding 42 from the master direction indicator 21.

The operation of the novel expander will now be apparent. As rotor 35 of inductive device 36 is displaced relative to stator winding 37 to such an extent that its output voltage varies substantially from a straight line, the signal has at secondary winding a further signal added to it from the novel signal expanding circuit. To this end the signal from stator winding 37 is applied through the control grid of triode 50 and to the suppressor grid of pentode 61. Also the signal from coupling transformer 65 is rectified to a direct current by rectifiers 72 and 73 and is applied to both the control grid 81 and the suppressor grid 59 of pentode 61. By suitably adjusting the voltage divider formed by resistors 85 and 86 the output of the pentode may be made to vary in accordance with the positive values as indicated in Fig. 4. Thus, as the signal from inductive device 36 tends to approach a negative value or deviate from its linear portion, the pentode supplies an equivalent signal so that a linear control effect is applied by way of lead 44 to flight path computer 14.

Figure 5:
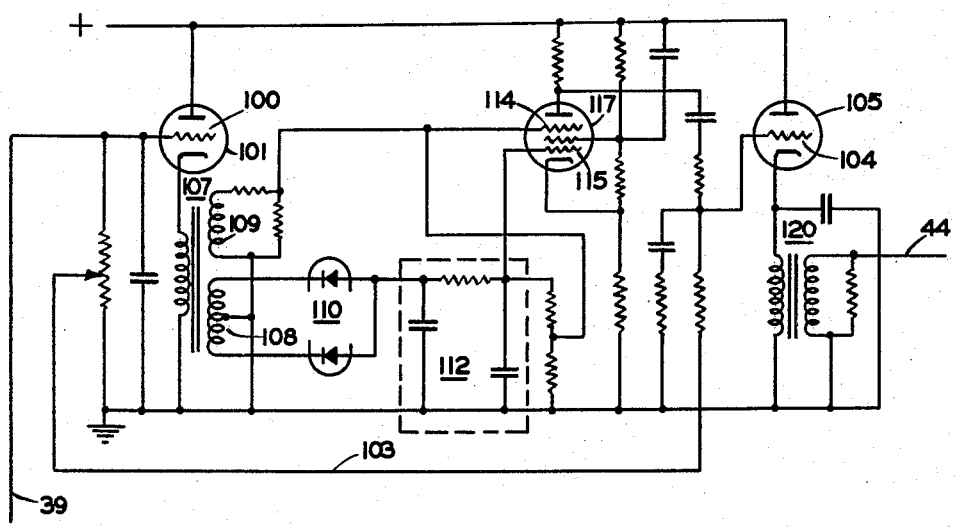
Fig. 5 is a wiring diagram for another embodiment of the novel signal shaping circuit of Fig. 1.

Fig. 5 is another embodiment of the novel signal expander of Fig. 1. In this embodiment, the input signal from lead 39 is applied to the grid 100 of an input triode 100 and by way of potentiometer 102 and lead 103 to the grid 104 of a mixer triode 105. A coupling transformer 107, which gives a cathode follower action, contains two secondary windings 108 and 109, one secondary winding 108 is connected through a full-wave rectifier 110 as in Fig. 1, the output of this rectifier being filtered by filter 112 and applied to the suppressor and control grids 114 and 115 of a pentode 117. The other secondary winding 109 is connected to the suppressor grid 114 of the pentode and so provides the input thereto. The output of pentode 117 is applied by way of lead 118 to the grid 104 of mixing triode 105. The output of tube 105 which is a summation of the signal from inductive device 36 of master direction indicator 21 and from the novel expanding circuit, is coupled across transformer 120 to lead 44 for application to the flight path computer 14.

The foregoing has presented a novel signal expander by which a sinusoidally varying signal from a signal developing device may be shaped to provide a linearly varying signal. With this arrangement, the signal from the signal developing device is unaffected as long as the signal is in the linearly varying portion of its curve. By using an expander circuit including a pentode with a dual bias control on the suppressor and control grids, the range of voltage gain variation of the tube is increased to such an extent that a conventional pentode type tube may be used in the instrument landing system, and this, together with the master direction indicator of the instrument landing system is able to provide a signal having sufficient strength to cause the craft to properly bracket a guide beam.

Although several embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. A signal system comprising reference means movable in response to a change in condition, an inductive signal generating device actuated by movement of said reference means, said device having the inherent characteristic of developing a signal whose amplitude varies sinusoidally with said movement, means responsive to said signal for developing a further signal whose magnitude varies in accordance with the deviation of said first named signal from a linear function, and means for combining said signals so that the combined signal is linear.

2. In combination, an inductive signal device actuable in response to deviation of a craft from a selected heading for developing a signal, said signal having desirable characteristics for control of the craft and also having the undesirable characteristic of an amplitude which varies sinusoidally with said craft deviation, means correcting said signal including, a variable gain amplifier having cathode, anode, control grid, and suppressor grid elements, means for applying a portion of said signal to said suppressor grid element, whereby the transductance between the cathode and anode elements is changed, means for developing a direct current bias from said signal, means connected to said last named means for applying said bias to said control grid element and said suppressor element, whereby said gain increases continuously with the amplitude of said signal, and means for summing the output of said amplifier and said signal whereby said summation signal varies linearly as said signal varies sinusoidally, means for developing a further signal in response to departure of said craft from a reference beam, and means under control of said summation and further signals for guiding said craft to and maintaining said craft on said beam.

3. In an instrument control system for a craft having thereon a receiver responsive to a guide beam from a remote transmitter for producing a first signal varying in amplitude and phase with the extent and direction of departure of said craft from said beam, an inductive signal device actuated in response to deviation of said craft from a selected heading for producing a second signal varying in amplitude and phase with the extent and direction of said deviation, and steering means controlled by said signals, said steering means exhibiting a tendency to steer said craft in a circle due to said second signal varying in amplitude as a sinusoidal function of said deviation because of inherent characteristics of said signal device, and means operable by the second signal for developing for the additional operation of said steering means a third signal having an amplitude to insure that the steering means will guide the craft to and maintain the craft on said beam.

4. In an instrument control system for a craft having thereon a receiver responsive to a guide beam from a remote transmitter for producing a first signal varying in amplitude and phase with the extent and direction of departure of said craft from said beam, an inductive signal device actuated in response to deviation of said craft from a selected heading for producing a second signal varying in amplitude and phase with the extent and direction of said deviation, and steering means controlled by said signals, said steering means exhibiting a tendency to steer said craft in a circle due to said second signal varying in amplitude as a sinusoidal function of said deviation because of inherent characteristics of said signal device, and means responsive to said second signal for developing for the additional operation of said steering means a third signal having an amplitude to insure that the steering means will guide the craft to and maintain the craft on said beam, said last named means including a variable gain amplifier for receiving a component of said second signal and developing said third signal and means for varying the gain of said amplifier as a function of the amplitude of said second signal.

5. In an instrument control system for a craft having thereon a receiver responsive to a guide beam from a remote transmitter for producing a first signal varying in amplitude and phase with the extent and direction of departure of said craft from said beam, an inductive signal device actuated in response to deviation of said craft from a selected heading for producing a second signal varying in amplitude and phase with the extent and direction of said deviation, and steering means controlled by said signals, said steering means exhibiting a tendency to guide the craft to and steer said craft in a circle due to said second signal varying in amplitude as a sinusoidal function of said deviation because of inherent characteristics of said signal device, and means responsive to said second signal for developing for the additional operation of said steering means a third signal having an amplitude to insure that the steering means will maintain the craft on said beam, said last named means including an amplifier developing said third signal as an output and having control and suppressor grids, means for applying said second signal to said suppresser grid as an input, and means further providing said suppresser and control grids with an input bias variable as a function of the amplitude of said second signal whereby a summation of said second and third signals provides a total signal varying substantially as a linear function of said deviation.

6. In a control system for a craft, means for developing a first signal varying in amplitude and phase with the extent and direction of departure of said craft from a guide beam, means for developing a second signal varying in amplitude and phase with the extent and direction of deviation of said craft from a selected heading, means under the control of said signals for steering said craft, and means operable by the second signal for developing a third signal for said steering means to aid said first and second signals in controlling said steering means to guide the craft to and maintain said craft on said beam.

7. In an instrument control system for a craft having thereon a receiver responsive to a guide beam from a remote transmitter for producing a first signal varying according to the angular displacement of the craft from said beam, direction reference means, a signal device responsive to said direction reference means for producing a second signal varying according to the deviation of the craft heading from a selected heading, steering means responsive to the summation of said signals for varying the heading of said craft, said steering means being subject to causing said craft to travel in a circle due to said signal device having inherent characteristics which result in said second signal varying as a non-linear function of said deviation, and means operable by the second signal for supplying a third signal to said steering means to cause said craft to be headed toward said transmitter.

8. In an instrument control system for a craft, means for producing a first signal varying according to angular departure of said craft from a guide beam, means for producing a second signal varying according to angular deviation of said craft from a selected heading, and means under control of said signals for steering said craft, said last named means exhibiting a tendency to cause said craft to circle when said craft initially approaches said beam at a large angle, and means operable by the second signal for aiding said second signal so that said craft is guided to and is maintained on said beam at said selected heading.

9. An automatic control system for an aircraft comprising operating means for developing a control effect for the craft corresponding to a function of the deviation of the craft from a predetermined heading, means for developing a signal corresponding to the angular deviation of the craft from the predetermined heading for controlling the operating means, the signal varying sinusoidally with the angular deviation, means for developing a component whose magnitude varies in accordance with the deviation of the signal from a linear function, and means connecting the signal means and the operating means including means for adding the component to the signal so that the operating means is controlled by the signal sum which varies linearly with the angular deviation.

10. An instrument control system for a craft comprising means for developing a control effect for the craft corresponding to a function of the deviation of the craft from a predetermined beam and a predetermined heading, including inductive signal means for developing a signal having an amplitude which is a sinusoidal function of the deviation of the craft from the predetermined heading, and means connecting the signal means and the control means including a variable gain amplifier operable by the heading signal for correcting the heading signal to vary substantially linearly with the deviation of the craft from said predetermined heading.

11. An automatic pilot system for a craft comprising means for developing a control effect for the craft corresponding to a function of the deviation of the craft from a predetermined beam and heading, including inductive signal developing means for developing a signal having an amplitude corresponding to a sinusoidal function of the deviation of the craft from the predetermined heading, and means connecting the signal means and the control means including a variable gain amplifier operable by the signal for developing a further signal for addition to the first signal for correcting the first signal to vary substantially linearly with the deviation from the predetermined heading.

12. A signal system for a craft comprising means for developing a signal upon angular deviation of the craft from a predetermined heading, the signal having desirable characteristics for controlling the craft along with the undesirable characteristic of corresponding in amplitude to a sinusoidal function of the deviation, and means including a variable gain amplifier for converting the signal to vary substantially linearly with deviation in heading of said craft.

13. In a signal system for a craft, means for developing a signal upon angular displacement of the craft from a predetermined reference including an inductive signal developing device, the signal from the device having in addition to desirable characteristics the undesirable characteristic of varying sinusoidally with the displacement, the means operable by the signal for developing a component whose magnitude varies in accordance with the deviation of the signal from a linear function, and means for adding the component to the signal so that the signal sum varies linearly with angular displacement of the craft.

14. In an automatic pilot system for developing a control effect for a craft corresponding to a function of the deviation of the craft from a predetermined beam and a predetermined heading, an inductive device for developing a signal corresponding to deviation of the craft from a predetermined heading, due to inherent characteristics of said device the signal varying in amplitude as a sinusoidal function of the angular deviation of the craft from the heading, means connected with the inductive device and operable by the heading signal for developing a component whose magnitude varies in accordance with the deviation of the signal from a linear function, and means for adding the component to the heading signal so that the signal sum varies substantially linearly with angular deviation of the craft from the predetermined heading.

15. In combination in a control system, an inductive device for developing a signal upon deviation in value of a condition from a predetermined value and whose amplitude varies sinusoidally with said deviation, an amplifier responsive to the signal for developing an output, means for increasing the gain of the amplifier as a function of the amplitude of the signal, and means for adding the output and the signal to provide a signal sum which varies substantially linearly with the deviation.

References Cited in the file of this patent

UNITED STATES PATENTS

| | | |
|---|---|---|
| 2,437,251 | Frische et al. | Mar. 9, 1948 |
| 2,482,809 | Thompson | Sept. 27, 1949 |
| 2,558,519 | Hill | June 26, 1951 |
| 2,580,376 | Moses | Dec. 25, 1951 |
| 2,611,128 | Pine et al. | Sept. 16, 1952 |
| 2,632,135 | Carpenter | Mar. 17, 1953 |
| 2,741,668 | Iffland | Apr. 10, 1956 |
| 2,784,401 | Dove | Mar. 5, 1957 |
| 2,793,246 | Olive et al. | May 21, 1957 |